United States Patent [19]
Harris et al.

[11] 3,936,510
[45] Feb. 3, 1976

[54] CURED AROMATIC RESINS
[75] Inventors: Glyn Islwyn Harris, Stourbridge; Alfred Gerald Edwards, Stourport-on-Severn, both of England
[73] Assignee: Albright & Wilson Limited, West Midlands, England
[22] Filed: July 19, 1974
[21] Appl. No.: 490,025

Related U.S. Application Data
[60] Continuation of Ser. No. 282,614, Aug. 21, 1972, abandoned, which is a division of Ser. No. 9,946, Feb. 9, 1970, abandoned.

[30] Foreign Application Priority Data
Feb. 17, 1969 United Kingdom............... 8479/69

[52] U.S. Cl.............. 260/831; 260/37 EP; 260/38; 260/830 R; 428/417
[51] Int. Cl.²..................... C08L 63/00; C08L 63/02; C08L 65/04
[58] Field of Search................ 260/830 R, 831, 838

[56] References Cited
UNITED STATES PATENTS
2,825,712  3/1958   Witzel................................ 260/831
3,275,708  9/1966   Bylsma................................ 260/830
3,338,844  8/1967   Harris et al........................... 260/2
3,384,618  5/1968   Imoto et al......................... 260/838
3,385,824  5/1968   Smith................................. 260/838
3,394,203  7/1968   Winegartner et al.............. 260/838
3,405,091  10/1968  Sprengling......................... 260/838
3,487,125  12/1968  Verdol................................ 260/830
3,513,221  5/1970   Huang et al....................... 260/830
3,576,788  4/1971   Harris et al......................... 260/52
3,632,555  1/1972   Harris et al......................... 260/47

Primary Examiner—John C. Bleutge
Attorney, Agent, or Firm—Herbert H. Goodman

[57] ABSTRACT

Cured aromatic resin compositions in which the resin is obtained by reacting (A) the reaction product of a mononuclear aralkyl halide and/or aralkyl ether with a molar excess of a phenol with 1-3 hydroxyl groups attached to the aromatic nucleus with (B) an epoxy compound containing at least two epoxy groups per molecule.

39 Claims, No Drawings

CURED AROMATIC RESINS

This is a continuation of application Ser. No. 282,614, filed Aug. 21, 1972, abandoned, which is a division of Ser. No. 9,946, filed Feb. 9, 1970, now abandoned.

This invention relates to curable aromatic resin compositions and to a process for curing aromatic resins.

In application No. 654,357 issued Apr. 27, 1971 as U.S. Pat. No. 3,576,788 there is described and claimed a process for the preparation of aromatic resins which comprises reacting (1) an aralkyl ether of the general formula R' $[-(CH_2OR)]_a$ and/or aralkyl halide of the general formula R" $[-(CH_2X)]_a$ wherein R' is a divalent or trivalent aromatic hydrocarbon or hydrocarbonoxy radical, R" is a divalent or trivalent aromatic hydrocarbon radical, R' and R" optionally containing inert substituents in the aromatic nucleus, R is an alkyl radical containing less than 6 carbon atoms, X is chlorine, bromine or iodine and $a$ has a value of 2 or 3, with a molar excess of (2) a phenolic compound or a phenolic compound and a compound containing aromatic nuclei.

As disclosed in the said U.S. Pat. No. 3,576,788 the resins prepared by the said process may be converted to higher molecular weight materials, that is cured, by heating with, for example, hexamethylene tetramine, chloranil or anhydroformaldehyde. We have now discovered that polymers of the type described in U.S. Pat. No. 3,576,788 can be cured by reaction with an organic compound containing at least two epoxy groups.

Accordingly this invention provides a process for the preparation of a cured aromatic resin which comprises (1) forming a polymer containing phenolic groups by reacting (a) an aralkyl ether and/or an aralkyl halide of the general formula R' $[-(CH_2X)]_a$ wherein $a$ has a value of 2 or 3, X is a halogen atom or an alkoxy radical containing less than 6 carbon atoms and R' is a divalent or trivalent aromatic hydrocarbon or hydrocarbonoxy radical in which the oxygen is present as an ether group, the radical R' optionally containing inert substituents in the aromatic nucleus, with a molar excess of (b) a phenolic compound, or both a phenolic compound and a compound containing aromatic nuclei, said compound or compounds containing at least two free nuclear hydrogen atoms per molecule, and (2) thereafter at least partially curing the polymer so produced by reaction with a compound containing at least two epoxy groups per molecule.

The invention also includes curable compositions comprising a mixture of the resin prepared according to (1) above and an epoxy compound containing at least two epoxy groups per molecule.

The term "phenolic compound" as employed herein in respect of reactant (b) includes any compound or mixture of compounds derived from benzene and containing from 1 to 3, preferably one or two hydroxyl radicals attached to the aromatic nucleus, there being at least two free nuclear hydrogen atoms per molecule, that is, at least two nuclear hydrogen atoms available for reaction with (a). Examples of phenolic compounds for use in the process of this invention include phenol, p-cresol, resorcinol, catechol, isopropyl catechol, beta-naphthol, diphenylolpropane, diphenylolmethane, alkyl phenols such as p-ethylphenol, p-tert-butylphenol and p-tert-octyl phenol, p-phenylphenol, m-phenylphenol, o-phenylphenol, pyrogallol, phlorogulcinol, 4,4¹-dihydroxysulphone and diphenylol propane. Most preferred as the phenolic compounds are those containing one or two hydroxyl radicals per aromatic nucleus for example, phenol, p-phenylphenol and resorcinol.

In accordance with step (1) of the process of this invention the phenolic compound is reacted with an aralkyl halide and/or an aralkyl ether (a) of the general formula R' $-(CH_2 X)_a$. In this general formula R' may represent any divalent or trivalent mononuclear aromatic hydrocarbon radical, for example the phenylene radical, or the radical

The radical x may be any alkoxy radical containing less than six, and preferably less than four, carbon atoms, for example the methoxy, propoxy, or butoxy radicals, or it may be a chlorine, bromine or iodine atom. The preferred compounds (1) for reaction with the phenolic compounds (2) are those in which $a$ has a value of 2, particularly the p-xylylene dihalides, for example p-xylylene dichloride, and the p-xylylane dialkylethers, for example p-xylyleneglycoldimethyl ether.

If desired the R' radicals may contain substituents, for example methyl radicals, attached to the aromatic nucleus provided the said substituents are inert under the conditions of the reaction. In fact the presence of chlorine or fluorine atoms in some or all of the available positions in the aromatic nucleus can be advantageous in that it leads to improved flame resistance in the resulting polymeric products Examples of substituted aralkyl ethers and aralkyl halides which may be employed according to this invention are 2,3,5,6-tetrachloro-1,4-di(methoxy-methyl)-benzene and 2,3,5,6-tetrachloro-1,4-di(chloromethyl)-benzene.

The reaction between the phenolic compound and the aralkyl ether or aralkyl halide involves condensation of the alkoxy radicals or halogen atoms in the aralkyl compound with nuclear hydrogen atoms in the phenolic compound, and, when present, the compound containing aromatic nuclei, with the elimination of an alcohol or a hydrogen halide. Preferably the process is carried out in the presence of a suitable catalyst for this reaction, for example, acid activated ball clays, sulphuric acid, p-toluene sulphonic acid, diethyl sulphate, or a Friedel Crafts type catalyst such as stannic chloride, zinc chloride or ferric chloride. The most preferred catalysts are stannic chloride and diethyl sulphate.

The quantity of catalyst employed is not critical and from about 0.01 to about 1 per cent by weight based on the weight of the reactants (a) and (b) has been found to be sufficient for most purposes although up to 3 per cent or more may be used if desired. In order to obtain reasonably short reaction times the reactants are preferably heated to temperatures in the range from about 130° to 200°C.

If desired organic solvents may be added to the reaction mixture for example to compatibilise the reaction components or assist in the recovery of the reaction product. Such organic solvents, if present, should preferably comprise the high boiling chlorinated aromatic compounds, with de-activated aromatic rings, for example chlorobenzene.

The time required for the performance of the step (1) reaction will depend upon such variables as the nature of the reactants (a) and (b), the type and quantity of the catalyst and the reaction temperatures. Preferably the reaction should be carried to substantial completion, the alcohol or hydrogen halide liberated being removed from the reaction mixture by any suitable means.

The phenolic compounds may be employed alone in forming the curable aromatic polymers or they may be employed in the reaction in conjunction with compounds containing aromatic nuclei and not being phenolic compounds, as required by this invention. The additional use of the said aromatic compounds in the reaction provides a means of modifying the properties of the product. Suitable aromatic compounds are those capable of condensation with the aralkyl halide or aralkyl ether and include for example diphenyl ether, dibenzyl ether, terphenyl, diphenylamine, diphenyl sulphide, diphenyl, anthracene, naphthalene, diphenyl sulphone, triphenyl phosphate and octaphenylcyclotetrasiloxane. Preferably the compound containing aromatic nuclei is selected from diphenyl, terphenyl and diphenyl ether. The compound containing aromatic nuclei may be employed in proportions of up to 75 per cent by weight or more based on the weight of the phenolic compound. The upper limit will normally be determined by the proportion of phenolic hydroxyl radicals desired for subsequent reaction with the epoxy compound according to Step (2) of the process of this invention.

Conveniently the compound containing aromatic nuclei is mixed with the remaining components and the reaction initiated. In some cases however, particularly where the aromatic compound is of low reactivity, it may be advantageous partially to react the compound containing aromatic nuclei with the aralkyl ether or aralkyl halide prior to incorporating the phenolic compound in the reaction mixture.

When the compound containing aromatic nuclei is employed it is not then essential that the phenolic compound should itself be present in molar excess over the aralkyl halide and/or aralkyl ether provided that the total of the phenolic compound and the compound containing aromatic nuclei taken together represents the required molar excess. As the molar proportion of the aralkyl halide or aralkyl ether approaches that of the other reactant the reaction mixture exhibits an increased tendency to gel prematurely. Generally therefore we prefer to employ from 1.3 to 3.0 and more preferably from 1.4 to 2.0 moles of the phenolic compound, or of the phenolic compound and the compound containing aromatic nuclei, for every mole of the aralkyl halide and/or aralkyl ether.

In accordance with step (2) the polymeric product obtained from step (1) is at least partially cured by reaction with a compound containing at least two epoxy groups

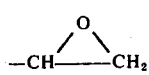

A wide variety of such epoxy compounds are known for example 1,2,3,4,-di-epoxybutene, 1,2,3-tri(1,2-epoxypropoxy)propane, cycloaliphatic epoxides e.g.

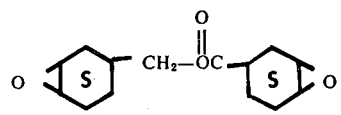

the diglycidyl ethers of bisphenol A, aliphatic diacid glycidyl esters e.g.

polyepichlorohydrins, poly(allylglycidylether) and organosilicon compounds containing at least two epoxide groups, for example those described in Specification No. 834,326. Also operative as the epoxy compounds for use according to the process of this invention are the epoxylated novelac resins both of the conventional type and of the type described in Application No. 746,283 Resins of the latter type may be prepared by reacting a phenolic polymer of the type obtainable according to step (1) of the present invention with an epihalohydrin in the presence of an acid acceptor.

The curing reaction according to step (2) may be carried out by mixing the phenolic product of step (1) with the epoxy compound and heating the mixture to a temperature at which reaction occurs between the phenolic groups and epoxy groups of the components of the reaction mixture. The temperature at which reaction occurs may vary with the nature of the reactions. Preferably curing is effected at temperatures above 80°C if extended curing times are to be avoided, the most preferred curing temperatures residing within the range from 110°C to 210°C. The curing of the phenolic polymer may be expedited by including in the composition an accelerator for the curing reaction. Suitable compounds for this purpose are those known as cure accelerators in connection with the anhydride curing of epoxy compounds and include morpholinium-p-toluene sulphonate, 2,4,6-tris(dimethylaminomethyl)-phenol and benzyldimethylamine. Hexamine may also be used as a cure accelerator and can bring about at least pertial cure of the aromatic resin in the presence of the epoxy compound at temperatures of 20°C or lower depending on the relative proportions of the components present. The cure accelerating compounds are effective in very small proportions, from 0.05 to 1.5 per cent by weight based on the weight of the aromatic resin usually being sufficient Curable compositions which are mixtures of the polymer containing phenolic groups, the compound containing epoxy groups and an accelerator for the curing reaction are also within the scope of this invention.

The proportion of the epoxide compound used may vary widely depending on the phenolic hydroxyl content of the curable polymeric product, the epoxide content of the epoxy compound and the degree of cure desired. The epoxide compound may thus be employed in proportions varying from a large deficiency to a large excess based on equivalency of epoxy groups in the epoxide compound and phenolic hydroxyl groups in the curable polymer. Preferably however, the epoxy compound is present in an amount of from 25 to 150 per cent by weight based on the weight of aromatic resin. The curing of the phenolic polymers according to this invention may be performed employing any desired sequence of operations. Thus, for example, the phenolic polymer may be prepared and the epoxy compound subsequently incorporated with the polymer with or without a cure accelerator when curing is to be effected.

Alternatively, the phenolic polymer may be partially pre-reacted with the epoxy compound to give a partially cured product which may, if desired, subsequently be more completely cured by further heating or by addition of further quantities of the epoxy compound.

Curable compositions comprising the phenolic resin and epoxy compound according to this invention are useful in the preparation of inter alia laminated and moulded products and as surface coating materials. If desired they may have incorporated therein organic solvents and may contain various fillers, for example, silicas and metal oxides and other additives, for example pigments.

The following examples illustrate the invention.

EXAMPLE 1

Phenol (12 moles, 1128 g.), p-xylyleneglycoldimethyl ether (8 moles, 1328 g.) and diethyl sulphate (0.012 moles, 1.6 ml.) were placed in a reaction flask fitted with a condenser and the contents of the flask heated with stirring at 136° to 160°C for approximately 2.5 hours, during which time the theoretical quantity of methanol was liberated. The reaction product was then dissolved in ethyl methyl ketone to give a 60 per cent by weight solution. This solution was designated Resin A Resin A (27 g) was mixed with a commercial epoxy compound sold as Bakelite ERL 4221 (12.6g.) and having the formula

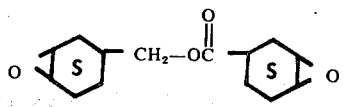

to give a mixture having an epoxy to phenolic Oh ratio of 1:1. When the mixture was heated at 175°C for 1 hour an infusible brown resin was obtained which was insoluble in organic solvents.

Similar results were obtained when the experiment was repeated employing proportions of Resin A and Bakelite ERL 4221 equivalent to phenolic OH/epoxy ratios of 1:2 and 2:1 respectively.

EXAMPLE 2

Resin A (27 g) was mixed with a commercially available epoxy resin Epikote 828 (19 g.), the resin being a diglycidyl ether of diphenylol propane, to give an epoxy group to phenolic group ratio in the mixture of 1:1. When this mixture was heated at 175°C for 1 hour an infusible light yellow solid was obtained which was insoluble in common organic

EXAMPLE 3

Resin A (50 g) was mixed with dicyclopentadiene dioxide (50 g.) and benzyldimethylamine (0.50 ml) added. After 65 minutes at 135°C the resulting mixture gelled to give a hard brown solid.

EXAMPLE 4

Resin A (50 g.) was mixed with the Dow Chemical Co. epoxy-nov lac resin D.E.N.431 (50.g.) and benzyldimethylamine (0.5 ml) added. The resulting system gelled within 30 minutes at 135°C to give a hard brown solid.

EXAMPLE 5

Resin A (405 g.) was mixed with an epoxy resin Epikote 828 (285 g.) (i.e. phenolic OH/epoxy ratio of 1:1) and benzyldimethylamine (0.5 g.) A further 200 gs. of ethylmethyl ketone was used to dilute the mixture and the solution was coated on to Marglass 317 glasscloth treated with an amino-silane finish to give a resin content of 33%. The coated glasscloth was precured at 135°C for 10 minutes, cooled and cut into twenty-four 10 inch squares which were then pressed together at 175°C for 1 hour at 1,000 p.s.i. The resulting laminated board was postcured from room temperature to 250°C in 4 hours and then at 250°C for 24 hours and had flexural strengths (measured in the warp direction) of 111000 p.s.i. at room temperature and 15200 p.s.i. at 250°C. Following heat aging of the laminate for 1000 hours at 250°c 109% of the room temperature and 76% of the 250°C strength was retained.

We claim:

1. A composition comprising the cured aromatic resin product consisting essentially of the product obtained by reacting at a temperature between 110° and 210°C
   A. the reaction product obtained by reacting at a temperature between 130° and 200°C
      1. a compound selected from the group consisting of aralkyl ethers of the general formula $R^1(-CH_2OR)_a$ and aralkyl halides of the general formula $R^1(-CH_2X)_a$ where R is an alkyl radical containing less than six carbon atoms, $R^1$ is a mono nuclear aromatic group, X is selected from the group consisting of chlorine, bromine and iodine, and $a$ is 2 or 3, with
      2. a phenol with 1 – 3 hydroxyl groups attached to the aromatic nucleus with at least two free nuclear hydrogen atoms per molecule, in a molar ratio of said phenol (2) to said ether or halide compound (1) being from 1.3 : 1 to 3 : 1, with
   B. an epoxy compound containing at least two epoxy groups per molecule, the molar ratio of phenolic groups in the reaction product (A) to the epoxy groups of the epoxy compound (B) being from 1 : 2 to 2 : 1.

2. A composition according to claim 1 where the molar ratio of phenolic compound to aralkyl compound is in the range 1.4 to 2.0 : 1.

3. A composition according to claim 1 wherein the phenol has one or two hydroxyl groups attached to the aromatic nucleus.

4. A composition according to claim 3 wherein the compound containing at least 2 epoxy groups per molecules is selected from the group comprising the resinous diglycidyl ethers of diphenylol propane and epoxy novolac resins.

5. A composition according to claim 3 wherein the phenol has one hydroxyl group attached to the benzene nucleus.

6. A composition according to claim 5 wherein the phenol is phenol.

7. A composition according to claim 3 wherein the phenol has two hydroxyl groups attached to the benzene nucleus.

8. A composition according to claim 7 wherein the phenol is selected from the group consisting of resorcinol and catechol.

9. A composition according to claim 5 wherein the aralkyl ether is p - xylylene glycol dimethyl ether.

10. A composition according to claim 7 wherein the aralkyl ether is p-xylylene glycol dimethyl ether.

11. A composition according to claim 5 which is obtained by the reaction of (A) with a mixture of (B) and a cure acceleration selected from the group comprising morpholinium p-toluene sulphonate, 2,4,6 - tris (dimethyl-aminomethyl) phenol benzyldimethylamine and hexamethylene tetramine.

12. A composition according to claim 7 which is obtained by the reaction of said reaction product A with said epoxy compound B in the presence of a cure accelerator selected from the group consisting of morpholinium p-toluene sulphonate, 2, 4, 6-tris (dimethylaminomethyl)phenol, benzyldimethylamine and hexamethylene tetramine.

13. A composition according to claim 12 wherein said cure accelerator is present in an amount of 0.05 to 1.5% by weight based on the weight of said reaction product A.

14. A composition according to claim 9 wherein the molar ratio of phenolic groups in the reaction product A to the epoxy groups in the epoxy compound B is about 1 : 1.

15. A composition according to claim 10 wherein the molar ratio of phenolic groups in the reaction product A to the epoxy groups in the epoxy compound B is about 1 : 1.

16. A composition according to claim 12 wherein the aralkyl ether is p-xylylene glycol dimethyl ether and the molar ratio of phenolic groups in said reaction product A to the epoxy groups of said epoxy compound B is about 1 : 1.

17. A composition according to claim 1 wherein R¹ is a phenylene group substituted by methyl or chlorine.

18. A composition according to claim 1 wherein the phenol has one hydroxyl group attached to the benzene nucleus.

19. A composition according to claim 4 wherein the phenol has two hydroxyl groups attached to the benzene nucleus.

20. A composition according to claim 19 wherein the phenol is selected from the group consisting of resorcinol and catechol.

21. A composition according to claim 19 wherein the aralkyl ether is p-xylylene glycol dimethyl ether and the molar ratio of phenolic groups in said reaction product A to the epoxy groups of said epoxy compound B is about 1 : 1.

22. A composition according to claim 21 which is obtained by the reaction of said reaction product A with said epoxy compound B in the presence of a cure accelerator selected from the group consisting of morpholinium p-toluene sulphonate, 2,4,6-tris (dimethylaminomethyl)phenol, benzyldimethylamine and hexamethylene tetramine.

23. A composition according to claim 1 wherein said epoxy compound B is a cycloaliphatic epoxide.

24. A composition according to claim 23 wherein the phenol has one or two hydroxyl groups attached to the aromatic nucleus.

25. A composition according to claim 24 wherein the phenol has one hydroxyl group attached to the benzene nucleus.

26. A composition according to claim 24 wherein the phenol has two hydroxyl groups attached to the benzene nucleus.

27. A composition according to claim 26 wherein the phenol is selected from the group consisting of resorcinol and catechol.

28. A composition according to claim 25 wherein the aralkyl ether is p-xylylene glycol dimethyl ether.

29. A composition according to claim 26 wherein the aralkyl ether is p-xylylene glycol dimethyl ether.

30. A composition according to claim 26 which is obtained by the reaction of said reaction product A with said epoxy compound B in the presence of a cure accelerator selected from the group consisting of morpholinium p-toluene sulphonate, 2,4,6-tris (dimethylaminomethyl) phenol, benzyldimethylamine and hexamethylene tetramine.

31. A composition according to claim 29 wherein said reaction product A is obtained by reacting p-xylylene glycol dimethyl ether with a phenol with two hydroxyl groups attached to a benzene nucleus, with a molar ratio of said phenol to said ether of 1.4 : 1 to 2 : 1 and said epoxy compound is of formula

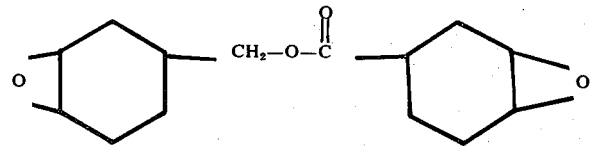

32. A composition according to claim 25 where in the compound containing at least 2 epoxy groups per molecule is dicyclopentadiene dioxide or

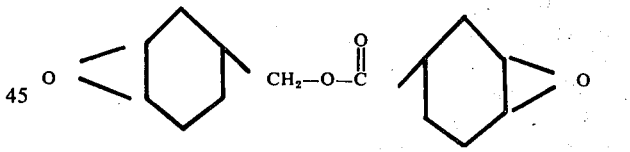

33. A composition comprising the cured aromatic resin product consisting essentially of the product obtained by reacting at a temperature between 110° and 210°C (A) the reaction product obtained by reacting at a temperature between 130° and 200°C.

1. a compound selected from the group consisting of aralkyl ethers-of the general formula R¹(—CH$_2$OR)$_a$ and aralkyl halides of the general formula R¹(—CH$_2$X)$_a$ where R is an alkyl radical containing less than six carbon atoms, R¹ is a mono nuclear aromatic group, X is selected from the group consisting of chlorine, bromine and iodine, and $a$ is 2 or 3, with (2) a phenol with 1-3 hydroxyl groups attached to the aromatic nucleus with at least two free nuclear hydrogen atoms per molecule, in a molar ratio of said phenol (2) to said ether or halide compound (1) being from 1.3 : 1 to 3 : 1, with (B) an epoxy compound containing at least two epoxy groups per molecule, the amount of said epoxy compound (B) being from 25 to 150% by weight of said reaction product (A).

34. A composition according to claim 33 wherein said epoxy compound is selected from the group consisting of the resinous diglycidyl ethers of diphenylol propane and epoxy novolac resins.

35. A composition according to claim 34 wherein said phenol has one or two hydroxyl groups attached to a benzene nucleus and said aralkyl ether is p-xylylene glycol dimethyl ether.

36. A composition according to claim 35 wherein said phenol has two hydroxyl groups attached to a benzene nucleus.

37. A composition according to claim 33 wherein said epoxy compound is a cycloaliphatic epoxide.

38. A composition according to claim 37 wherein said epoxy compound is of formula

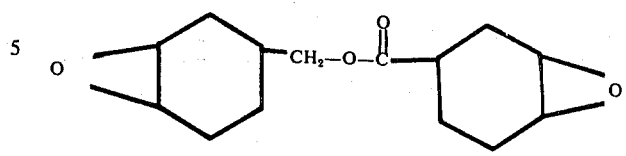

39. A composition according to claim 37 wherein said phenol has two hydroxyl groups attached to a benzene nucleus and said aralkyl ether is p-xylylene glycol dimethyl ether.

* * * * *

UNITED STATES PATENT OFFICE
CERTIFICATE OF CORRECTION

Patent No. 3,936,510          Dated February 3, 1976

Inventor(s)   GLYN ISLWYN HARRIS et al

It is certified that error appears in the above-identified patent and that said Letters Patent are hereby corrected as shown below:

Column 6, line 30, replace "others" with --ethers--.

Column 7, line 7, replace "acceleration" with --accelerator--.

Signed and Sealed this

Sixteenth Day of November 1976

[SEAL]

Attest:

RUTH C. MASON
*Attesting Officer*

C. MARSHALL DANN
*Commissioner of Patents and Trademarks*